Feb. 21, 1939.  M. H. DELANNE  2,147,968
AIRCRAFT
Filed Sept. 3, 1935    2 Sheets-Sheet 1
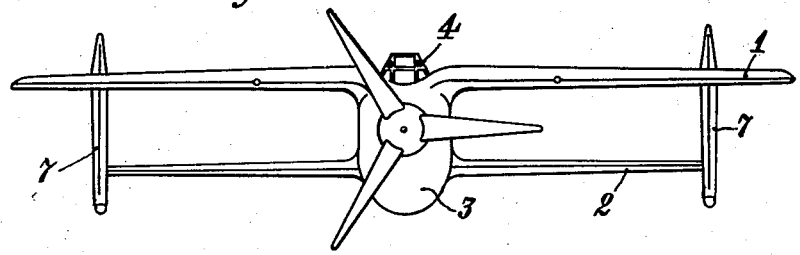
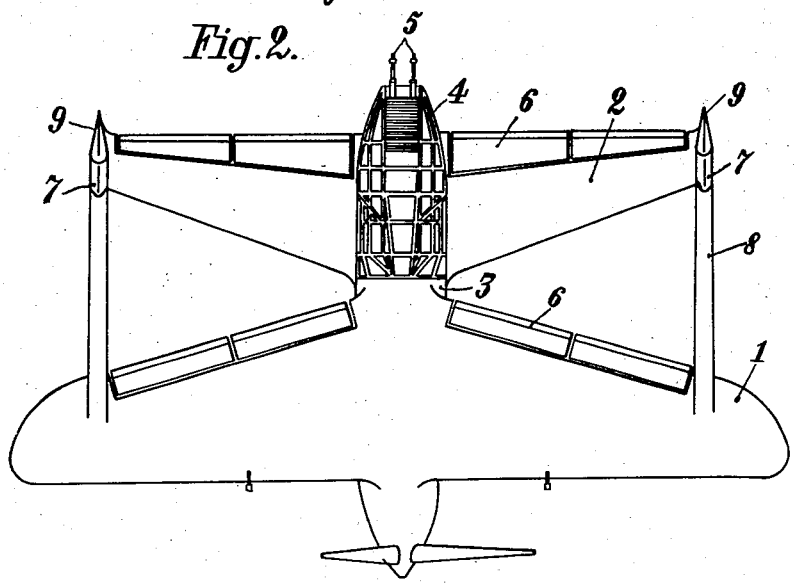
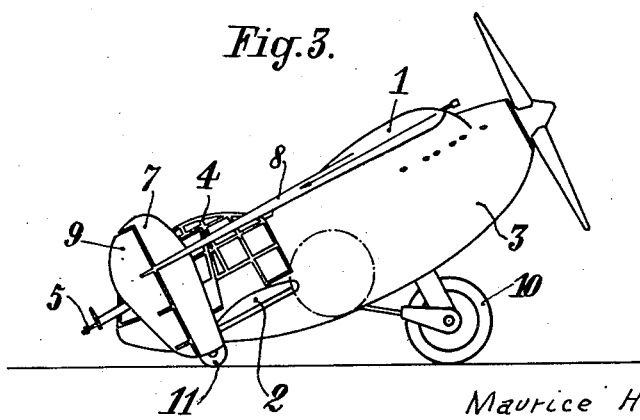
INVENTOR
Maurice Henri Delanne
BY
Emil Bönnelycke
ATTORNEY Feb. 21, 1939.   M. H. DELANNE   2,147,968
AIRCRAFT
Filed Sept. 3, 1935   2 Sheets-Sheet 2
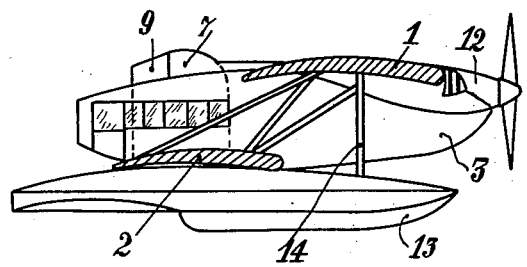
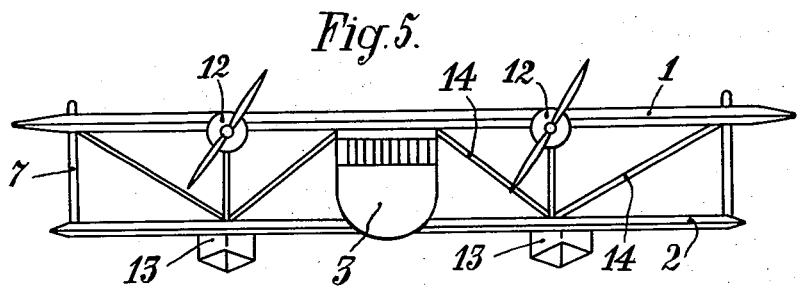
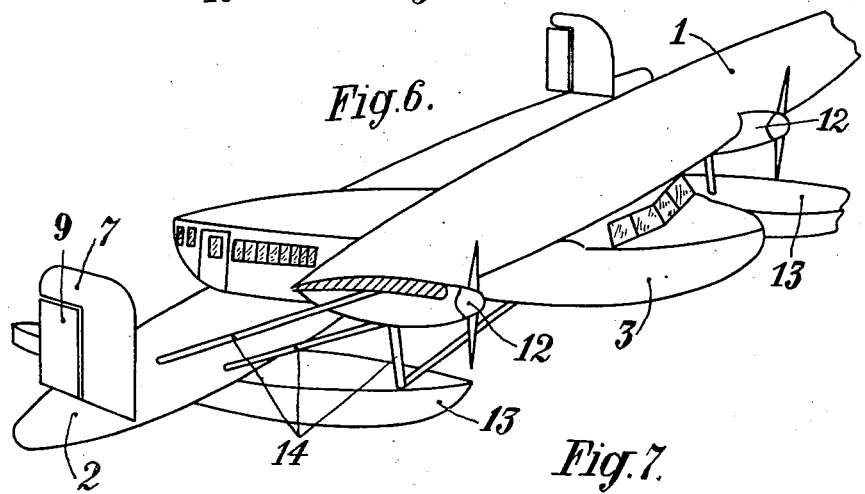
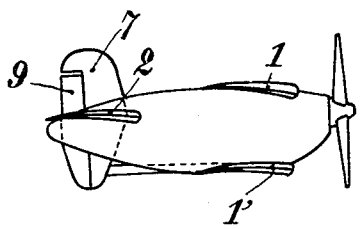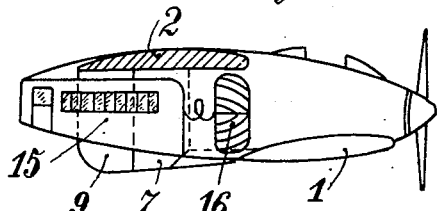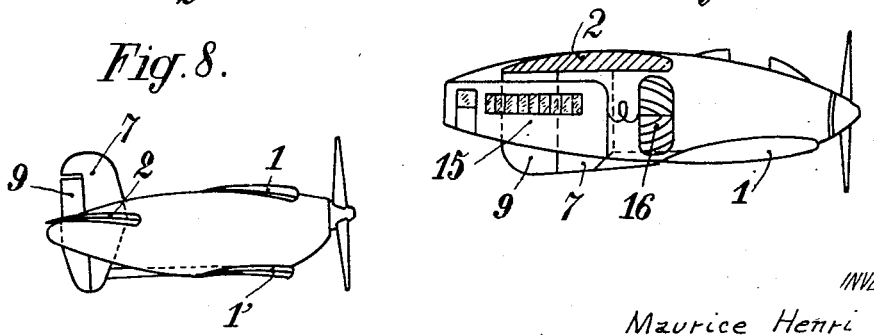
INVENTOR
Maurice Henri DeZanne
BY
Emil Bönnelycke
ATTORNEY Patented Feb. 21, 1939

2,147,968

UNITED STATES PATENT OFFICE 2,147,968

AIRCRAFT

Maurice Henri Delanne, Paris, France

Application September 3, 1935, Serial No. 39,033
In France July 4, 1935

4 Claims. (Cl. 244—13)

My invention has for its subject an airplane or hydroplane presenting in comparison with known aircraft a considerable improvement in the qualities of minimum gliding ratio and buoyancy and enabling a more advantageous utilization of the fuselage, a more extended visibility and greater security.

In the said airplane (or hydroplane) the axial fins, both vertical and horizontal, are entirely eliminated and replaced by a horizontal rear wing, or there is provided a dihedral, rigidly secured to the fuselage. This wing is stationary; it is displaced relatively to the front wing. It is provided on each side of the fuselage with a vertical lateral drift.

This rear wing co-operates with the front wings (monoplanes or biplanes) for increasing both the carrying capacity and the capability of manoeuvring the apparatus. It receives from the front wings an inter-action effect which improves the general buoyancy of the aircraft.

According to my invention, in an airplane or hydroplane provided with a rear wing as above specified, the whole of the fuselage is rendered habitable from the front to the rear end. This arrangement is only rendered possible by the modification of the buoyancy and lift of the aircraft due to the use of a rear wing.

The rear portion of the fuselage, extending if desired behind the rear wings, may be relatively short and fitted up as a cabin for the pilot and the whole or a portion of the crew, for example, passengers, or a machine-gun post and so forth, from which the field of visibility towards the rear and towards the side is not obstructed by the fins or by the usual corresponding parts of the fuselage.

According to this method of construction the pilot's cabin is thus located at the rear of the aircraft. This arrangement enables the cabin to be rendered detachable without having to fear the risk presented by the fins in such an operation.

Finally another feature of my invention consists in the arrangement of the landing gear. This is formed by a single wheel placed at the front in the axial plane of the fuselage and by two smaller wheels placed at the ends of the rear wing. There is thus obtained a larger supporting surface without destroying the qualities of minimum gliding ratio of the apparatus.

The single front wheel can easily be retracted during flight without necessitating complicated operating devices and the two small wheels located at the ends of the wings and secured thereto do not produce any appreciable loss in the minimum gliding ratio and, in any case, the whole is much less resistant to forward movement than ordinary landing gears.

The advantages possessed by the airplane or hydroplane according to my invention are the following:

1. There are eliminated the parasite parts, that is to say, on the one hand, the horizontal fins, on the other hand the useless regions for fitting up and rendering habitable the fuselage and corresponding either to the rear portion of the fuselage or to an asesmblage of braced connecting beams.

This eliminating permits of an appreciable saving in the dead weight of the apparatus as the parts which have no action on the speed or the lift are omitted. There is thus obtained a very considerable benefit on the passive resistance of the apparatus resulting in an increase in the minimum gliding ratio, that is to say according to the types of apparatus, either a very clear gain in speed or a saving in the power necessary for flight. Also by reason of the provision of the said wings there is obtained a substantial gain in buoyancy due to the interaction of the lifting surfaces.

Moreover, as the fuselage is solely reserved for the purpose of occupation and is relieved of its function as support for the fins with long lever arms, it becomes habitable along its entire length without empty compartments.

It may therefore be arranged both in the most comfortable and in the most useful manner and substantially shortened thus resulting in the saving in weight and gain in minimum gliding ratio as above referred to, this saving in weight being increased by reason of the fact, that it does not have to support the forces due to the fins.

2. The apparatus according to my invention permits of providing at the point where there are usually provided the fins of modern aircraft (that is to say at the rear of the usual apparatus or at the front of aircraft of the type known as "Duck" (Canard) a space completely free from any material obstruction formed by a vertical or horizontal axial fin, by bracing, struts or connecting beams.

The said obstacles are in fact completely eliminated. There thus results, according to the type of aircraft under consideration, either an integral field of visibility towards the rear, from the zenith to the nadir, as also over the corresponding horizontal semicircumference and in all the planes thus defined.

Visibility remains integral towards the front throughout the entire upper hemisphere.

3. The field thus defined for the visibility of a touring or observation apparatus may become the field of firing of a military apparatus which may thus ensure a perfect defence towards the rear, not only upwardly but also downwardly, as also in a horizontal direction, which result it has hitherto only been possible to obtain with various complications of which the chief are:

*a.* The presence of a gunner at the rear of the fins, the gunner is at a considerable distance from the remainder of the crew from which he is completely isolated. His presence complicates the centering of the apparatus.

The fins prevent any possibility of firing towards the front and even any visibility for enabling him to reveal the arrival of an enemy within his range of fire.

*b.* The presence of two gunners in the lateral nacelles situated for example at the rear of the engine nacelles. This solution necessitates the presence of a double crew and armament, thus an increase in weight.

The crews in the usual aircraft are deprived of any communication with the pilot and the navigation officer and cannot receive orders.

The combined action can at the most only cope with the rear half hemisphere, firing along the rear axis downwardly being prevented, although this is a usual and regular tactic of pursuing aircraft. Moreover machine guns are more frequently placed in the draft of the screw of a powerful engine which considerably interferes with the accuracy of firing.

On the contrary in the aircraft according to the invention a single gunner installed in the best conditions of comfort and near the remainder of the crew with whom he remains in constant visual and audible communication copes with the entire region indicated and renders any attack from the rear practically impossible.

4. Moreover the facilities of parachuting are considerably increased, there being no possibility of hooking on the rear surfaces.

There is even a possibility of effecting collective parachuting by detaching the cabin placed at this point. This parachuting is obtained directly without any preliminary operation of displacement or rolling of the cabin, this falling immediately with a free drop.

There may also be considered that at the commencement of the drop of the cabin a parachute is not unfolded and that it is opened only after the cabin, separated from the aircraft has lost a considerable portion of its horizontal speed, which is generally very inconvenient.

With the arrangement according to the invention there are obviated the disadvantages of cabins which can be detached and which consist either in placing this under the fuselage or, when the cabin is located on the fuselage, to provide devices for placing it in position before detaching.

5. Moreover access from the ground into the apparatus when at rest becomes extremely easy from the rear as the latter rests in the immediate neighborhood of the ground, thus within reach of the passengers without a ladder or steps and that its habitability from the front to the rear permits of easy circulation so that each of the members of the crew or passengers can reach the place assigned to him without acrobatic movements.

The accompanying drawings show by way of example airplanes or hydroplanes according to my invention.

Figs. 1, 2 and 3 are a front view, plan view and side elevation of one method of construction particular to an airplane according to the invention.

Figs. 4 and 5 are side and front views of a hydroplane according to the invention.

Fig. 6 is a perspective view of this hydroplane.

Figs. 7 and 8 show modifications.

In Figs. 1 to 3, 1 indicates the front wing and 2 the rear wing, the former being located at the upper portion of the fuselage and the rear wing being located at a lower level. At the rear of the fuselage is provided a cabin 4 which extends slightly beyond the wing 2 and from which the field of visibility and firing is very extended. 5 indicates two machine guns located entirely at the rear of this fuselage.

The manoeuvring may be ensured by means of hinged ailerons mounted on the wings 1 and 2 of which the shapes and dimensions, as will be understood, are selected in such a manner as to ensure the desired lift and stability. The steering is ensured by means of rudders 7 secured laterally, for example, to the ends of the wings 2 and secured by reinforcing elements 8 to the front wings or to the cabin; these rudders are provided with ailerons 9 which enable the course to be modified at will.

The securing of these lateral rudders to a wing of which the structure is robust, obviates the usual vibrations of rudders secured to the end of thin tubular beams of low inertia and even of fuselage of the very thin circular section towards the rear for reasons of minimum gliding ratio or field of firing.

This securing may be effected at any suitable point of the spread of the wings either very near to the fuselage (cabin) if it is desired to obtain a draft effect from an axial screw or at a suitable distance so as to obtain a draft effect from lateral screws or at the ends of the wings for obtaining a panel effect destroying the losses by marginal effect or in any other intermediate position.

In Fig. 3 it will be seen that when on land the aircraft can rest at the front on its landing gear 10 and at the rear on small wheels 11 in such a manner that the cabin is very close to the ground and that it is not necessary to use ladders or steps for gaining access thereto.

The particular arrangement of the landing gear (already discovered by me and described in another application) is applicable in a particularly advantageous manner to the aircraft according to my invention.

This arrangement consists in providing two skids or small wheels 11 at the ends of the rear wing 2 and a single wheel 10 in front of the centre of gravity and located along the axial plane of the fuselage. This single wheel 10 may easily be retracted into the fuselage.

By reason of the large dimensions of the wing 2 the wheels 11 are a sufficient distance from one another. This landing gear with a front point and two rear points constitutes a triangle of lift, much more extended than that of ordinary apparatus, which improves its stability when it rests on the ground and also imparts to the aircraft all the advantages which I have set out in another application.

Figs. 4, 5 and 6 show a commercial twin-engined hydroplane provided with two motor nacelles 12 placed in front of the front wing 1 and two floats 13 placed under the rear wing, these wings being connected together by struts 14.

The motors may be mounted at the front or at the rear; in any case the tractive or propelling screws are completely free and operate under the best conditions. Also the cabins, machine-gun posts, towers and so forth may be arranged equally well at the front or at the back.

The cabin 15 (Fig. 7) need not be fixed to the fuselage but may be connected thereto in a manner so as to be detachable easily at the will of the pilot. It is therefore provided with a parachute 16 of suitable dimensions of which the unfolding takes place automatically when the cabin is detached and falls.

Fig. 7 shows a modification of the airplane in which the wings are arranged in the reverse manner (the front wing at the bottom, the rear wing at the top). This modification, even though there are lost certain advantages of visibility upwards and rearwardly, increases the security in parachuting the cabin.

It is to be noted that the number and the relative positions of the front and rear wings may be varied. For example the airplane may be provided (Fig. 8) with two front superposed wings 1 and 1' and a rear wing 2. The superposed wings may be independent as in double monoplanes or may be connected together by struts whereby they are securely fixed together and relatively to the fuselage.

Ailerons serving for banking may be mounted on one or more of the wings.

Lateral motor nacelles, of any suitable number, may be secured either to the wings or to the struts. This arrangement would be impossible if the wings were hinged.

It will be understood that it is also possible, without departing from the invention, to apply all other modifications to the forms of construction hereinbefore described provided that there is maintained the essential arrangement which characterizes this invention.

Having thus described my invention, I claim:—

1. An airplane without horizontal and vertical axial fins, comprising a fuselage with an inhabitable load-carrying space throughout its length, a motor and screw in front of the fuselage, a forward fixed wing, ailerons on said wing, said fuselage having a passenger cabin at the rear thereof and communicating with the forward portion of said fuselage, a rear fixed wing staggered relatively to the forward wing by a distance at least equal to the width of the front wing and extending laterally on opposite sides of said cabin, depth steering means on the rear wing, and two vertical rudders located at the ends of the rear wing on opposite sides of said cabin, the rearward portions of said rear wing, the ailerons and the rudders thereof being positioned forwardly of the rear portion of said cabin to provide a free unobstructed rear view from said cabin.

2. An airplane without horizontal and vertical axial fins, comprising a fuselage containing at its rear end a cabin for the pilot and passengers, a motor and screw in front of the fuselage, a forward fixed wing, ailerons on said wing, a rear fixed wing staggered relatively to the forward wing by a distance at least equal to the width of the front wing and extending laterally on opposite sides of said cabin, depth steering means on the rear wing, and two vertical rudders located at the ends of the rear wing on opposite sides of said cabin, the rearward portions of said rear wing, the ailerons and the rudders thereof being positioned forwardly of the rear portion of said cabin to provide a free unobstructed rear view from said cabin.

3. An airplane without horizontal and vertical axial fins, comprising a fuselage containing at its rear end a detachable cabin for the pilot and passengers, a parachute located in the fuselage forward of the cabin, a motor and screw in front of the fuselage, a forward fixed wing, ailerons on said wing, a rear fixed wing staggered relatively to the forward wing by a distance at least equal to the width of the front wing and extending laterally on opposite sides of said cabin, depth steering means on the rear wing, and two vertical rudders located at the ends of the rear wing on opposite sides of said cabin, the rearward portions of said rear wing, the ailerons and the rudders thereof being positioned forwardly of the rear portion of said cabin to provide a free unobstructed rear view from said cabin, and the ailerons and rudders on said rear wing being sufficiently spaced from said cabin to permit free unobstructed launching movement of said cabin from the fuselage.

4. An airplane without horizontal and vertical axial fins, comprising a fuselage containing at its rear end a detachable cabin for the pilot and passengers, a parachute located in the fuselage forward of the cabin, a motor and screw in front of the fuselage, a forward fixed wing, ailerons on said wing, a rear fixed wing staggered relatively to the forward wing by a distance at least equal to the width of the front wing and extending laterally on opposite sides of said cabin, depth steering means on the rear wing, two vertical rudders located at the ends of the rear wing on opposite sides of said cabin, the rearward portions of said rear wing, the ailerons and the rudders thereof being positioned forwardly of the rear portion of said cabin to provide a free unobstructed rear view from said cabin, and the ailerons and rudders on said rear wing being sufficiently spaced from said cabin to permit free unobstructed launching movement of said cabin from the fuselage, and landing gear including a single large front wheel located at about the center of gravity of the airplane and a pair of smaller wheels located at the ends of the rear wing, said rear wheels being small enough to lower the rear cabin to facilitate access thereto from the ground.

MAURICE HENRI DELANNE.